United States Patent [19]  [11] 4,354,695
Sato  [45] Oct. 19, 1982

[54] SEAT BELT SYSTEM
[75] Inventor: Yoshimi Sato, Yokohama, Japan
[73] Assignee: Nissan Motor Company, Limited, Yokohama, Japan
[21] Appl. No.: 164,275
[22] Filed: Jun. 30, 1980
[30] Foreign Application Priority Data
Jul. 20, 1979 [JP] Japan .................................. 54-92767
[51] Int. Cl.³ ............................................. B60R 21/00
[52] U.S. Cl. ..................................... 280/804; 297/469
[58] Field of Search ....................... 280/802, 804, 808; 297/469, 483, 485

[56] References Cited
U.S. PATENT DOCUMENTS

| 3,770,078 | 11/1973 | Keppel et al. | 180/111 |
| 3,830,518 | 8/1974 | Silber | 280/804 |
| 4,061,365 | 12/1977 | Nagano et al. | 280/804 |
| 4,186,942 | 2/1980 | Patel | 280/804 |
| 4,238,129 | 12/1980 | Yasumatsu | 297/469 |

FOREIGN PATENT DOCUMENTS

| 2146617 | 3/1973 | Fed. Rep. of Germany . |
| 2306224 | 9/1973 | Fed. Rep. of Germany . |
| 2552862 | 6/1976 | Fed. Rep. of Germany . |
| 2643818 | 3/1978 | Fed. Rep. of Germany . |
| 2720789 | 11/1978 | Fed. Rep. of Germany | 280/808 |
| 2920810 | 12/1979 | Fed. Rep. of Germany | 280/804 |
| 2927404 | 2/1980 | Fed. Rep. of Germany . |
| 2433440 | 3/1980 | France . |
| 2433441 | 3/1980 | France . |
| 1407984 | 10/1975 | United Kingdom . |

Primary Examiner—Joseph F. Peters, Jr.
Assistant Examiner—Ross Weaver
Attorney, Agent, or Firm—Schwartz, Jeffery, Schwaab, Mack, Blumenthal & Koch

[57] ABSTRACT

A seat belt system for an automotive vehicle, includes a shoulder belt the lower end of which is fixed to a floor of the vehicle body and the upper end of which is connected with a slider, a guide rail fixed relative to the vehicle body along its longitudinal direction, the guide rail having its engaging portion to be engaged with an engaging portion of the slider so that the slider is slidably fitted to the guide rail, means for actuating the slider in response to the opening and closing a door of the automotive vehicle, and means for locking the slider in its rearmost position, the engaging portion of the slider facing the side wall of the vehicle body to which the guide rail is fixed, so that the slider can slidably move between the guide rail and the side wall of the vehicle body.

10 Claims, 22 Drawing Figures

FIG. 4A (PRIOR ART)   FIG. 4B (PRIOR ART)   FIG. 5
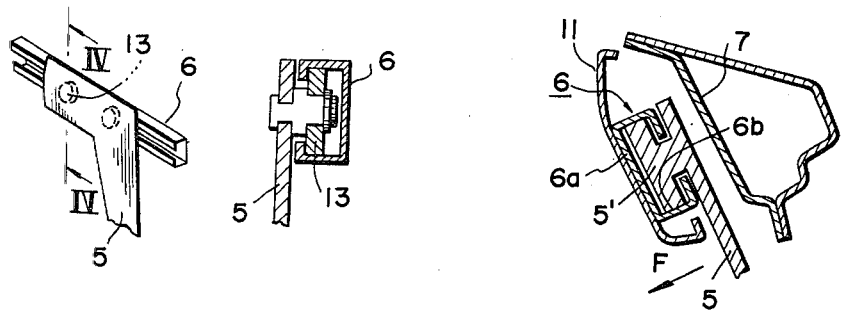
FIG. 6
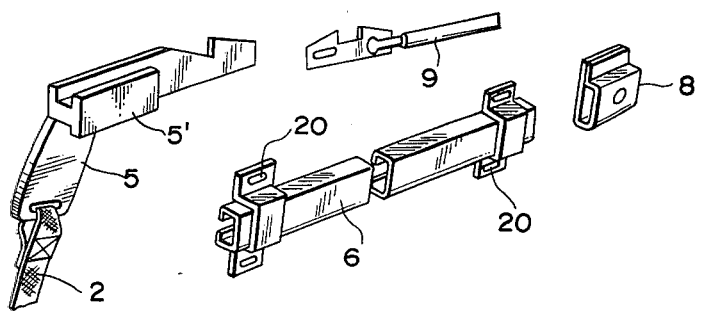
FIG. 7
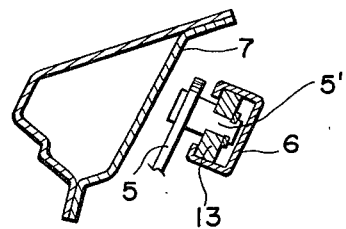

SEAT BELT SYSTEM

BACKGROUND OF THE INVENTION

This invention relates to a seat belt system for an automotive vehicle, and more particularly relates to an improved structure for slidably mounting onto a guide rail a slider connected with the upper end of a shoulder belt.

FIG. 1 illustrates a conventional seat belt system in which a shoulder belt is automatically locked on a passenger or driver. A front seat 1 is arranged in the vehicle body. A shoulder belt 2 provided near the front seat 1 has one end which is connected through a retractor 3 with a floor 4 of the vehicle body and the other end which is connected with a slide block or slider 5. The slider 5 is slidably guided by a guide rail 6 fixed to a roof side rail 7. An anchoring device 8 is positioned at the rear end of the guide rail 6. An actuating wire 9 is connected at its one end with the engaging portion of the slider 5 for pushing and pulling it when it is actuated by a motor 10 in response to the opening and closing of a door. That is, when the door is opened, the slider 5 moves forwards so as to permit the driver or passenger to sit on the seat, and when it is closed, the slider 5 moves backwards so as to tighten the seat belt automatically on the driver or passenger.

As shown in FIG. 2, the guide rail 6 is formed in a channel shape so as to facilitate the fitting of it to the roof side rail 7. The base portion 6a of the guide rail 6 is directly fixed on the roof side rail 7 while the engaging portion 6b thereof protrudes into the passenger compartment. The open side of the engaging portion 6b faces the passenger compartment. The engaging portion 5' of the slider 5 engages the engaging portion 6b of the guide rail 6. When the force is exerted on the slider 5 in the direction denoted by the arrow F, the slider 5 is mainly supported by the flange portion 6c formed at the lower edge of the guide rail 6. The flange portion 6c of the guide rail 6 is apt to deform so that the slider 5 jumps or gets off the guide rail 6.

In order to prevent the slider 5 from getting off the guide rail 6, the height H of the flange portion 6c may be set large. However, it results in the enlargement of the inner height C of the guide rail 6.

When the force is exerted on the slider 5 in the direction F', the shearing load is given to the inward edge $G_1$ of the neck portion of the engaging portion 5' of the slider 5. Thus, the width D of the engaging portion 5' of the slider 5 must be enlarged.

The section of the guide rail 6 and the slider 5 must be enlarged in order to obtain a reinforced structure whereby the slider 5 does not get off the guide rail 6. This causes the space of the passenger compartment to become small or restricted so that the driver and/or passengers can not comfortably enter into and sit in the compartment. Thus, such a reinforced structure can be arranged only in the vehicle body having a larger size of roof side rail.

The height C and width E of the guide rail 6 must be carefully set accurate so as to actuate smoothly the slider 5. However, if the guide rail 6 is formed along the curved inside wall of the vehicle body, the height C and the width E of the guide rail 6 are often not accurate. Therefore, the guide rail 6 must be straight in order to avoid such a problem.

Also, because it is dangerous if the engaging portion 5' of the slider 5 is exposed, the engaging portion 5' of the slider 5 is usually covered by a trim cover 11 as shown in FIG. 3. In such a case, a bracket 12 must be additionally provided to fit the trim cover 11 to the guide 6 or the roof side rail 7. This causes the production cost and the weight of the vehicle body to increase.

In order to improve the workability of the slider 5, a roller 13 may be provided as the engaging portion 5' of the slider 5 engaging with the guide rail 6 as shown in FIGS. 4A and 4B. In such a case, the slider 5 easily gets off the guide rail 6 because the contact area of the engaging portion of the slider 5 with the guide rail 6 is small.

SUMMARY OF THE INVENTION

An object of the present invention is to overcome the above-stated defects of the prior art structure.

A further object of the present invention is to provide an improved structure for mounting slidably onto a guide rail a slider connected with the upper end of a shoulder belt for an automotive vehicle wherein the slider can be smoothly actuated with a compact and simple construction.

BRIEF DESCRIPTION OF THE DRAWINGS

These and other objects, features and advantages of the present invention will become more apparent from the following description of preferred embodiments thereof when taken in conjunction with the accompanying drawings in which:

FIG. 4A is a perspective view showing a further conventional structure for mounting a slider onto a guide rail for an automotive vehicle;

FIG. 4B is a sectional view taken along the line IV—IV in FIG. 4A;

FIG. 5 is a sectional view showing a structure for mounting a slider onto a guide rail for an automotive vehicle according to a first embodiment of the present invention, corresponding to FIG. 2;

FIG. 6 is a disassembled view of the structure as shown in FIG. 5;

FIGS. 7 through 11 show the second, third, fourth, fifth and sixth embodiment of the present invention, respectively;

DETAILED DESCRIPTION OF THE PREFERRED EMBODIMENTS

Figure 1:
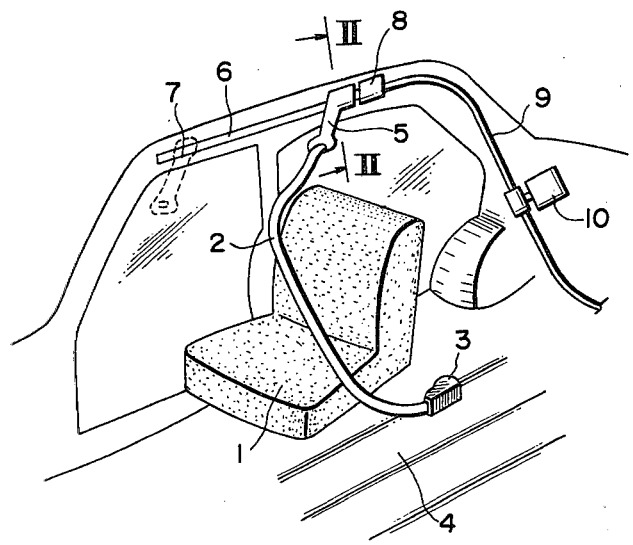
FIG. 1 is a schematic perspective view showing partly an automotive vehicle equipped with a seat belt apparatus.
Figure 2:
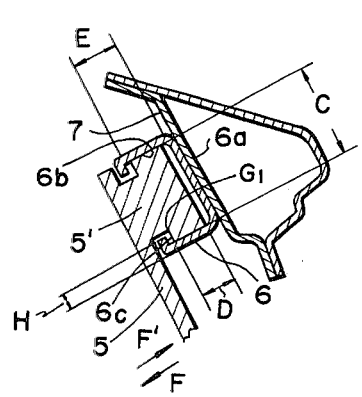
FIG. 2 is a sectional view showing a conventional structure for mounting a slider onto a guide rail for an automotive vehicle.
Figure 3:
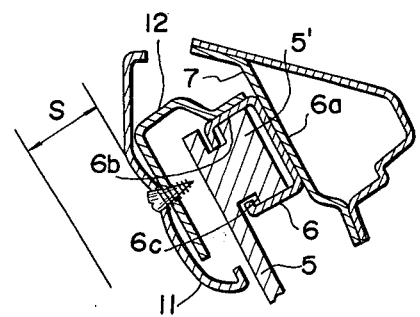
FIG. 3 is a sectional view showing a conventional structure additionally equipped with a trim cover, corresponding to FIG. 2.

A structure for mounting onto a guide rail a slider connected with the upper end of a shoulder belt for an automotive vehicle according to the present invention can be applied to the automotive vehicle body as shown in FIG. 1. Therefore, the detailed description of the inside of the automotive vehicle is omitted, and the corresponding parts and members are denoted by the same references as in FIG. 1.

Referring now to FIGS. 5 and 6, the engaging portion 6b of the guide rail 6 which engages slidably the engaging portion 5' of the slide block or slider 5 has an open side facing the roof side rail 7 fixed to a side wall of the vehicle body. The closed or base side 6a of the guide rail 6 faces toward the center of the passenger compartment. The slider 5 slidably moves forwardly or backwardly along the guide rail 6 between the roof side rail 7 and the guide rail 6. The guide rail 6 is fixed near both ends thereto to the roof side rail 6 by fixing means 20, but the open side of the guide rail 6 is set apart from the inner wall of the roof side rail 7 so as to form a clearance for the slidable movement of the slider 5. In other words, the base portion of the guide rail 6 does not contact the roof side rail 7 unlike the prior art. It should be noted, however, that the guide rail 6 can be formed to partly contact the roof side rail 7 according to another aspect of the present invention. For example, the upper edge of the guide rail 6 may fixedly contact the roof side rail 7 if the lower edge thereof is apart from the roof side rail 7 so as to form a desired clearance or space through which the slider 5 can move.

As shown in FIG. 1, the anchoring device 8 is placed near the rear end of the guide rail 6 as in the prior art so that it can lock the slider 5 when the slider 5 moves to the rearmost position in response to the closing of the door. The upper end of the shoulder belt 2 is connected with the connecting portion of the slider 5 so that the slider 5 can be actuated to move along the guide rail 6 thereby to permit the driver to sit on his seat or to tighten the shoulder belt 2 on the driver or passenger. The actuating wire 9 is connected at its front end with the slider 5 for pushing and pulling the slider 5 in a conventional manner.

As shown in FIG. 5, a trim cover 11 can be fixed directly onto the base portion 6a of the guide rail 6 so as to cover the guide rail 6.

The inner space of the guide rail 6 is in a T-shape in section, and the slider 5 has the corresponding section at its engaging portion 5' so that the latter can fit within the former so as to securely support the slider 5.

When the force is exerted on the slider 5 in the direction F in FIG. 5, the engaging portion 5' of the slider 5 is supported by the whole part of the base portion of the guide rail 6. Thus, even if the slider 5 and the guide rail 6 are small in size, the former does not get off the latter. Also, the guide rail 6 can be formed so thin as to improve the applicability thereof to a variety of vehicle bodies.

The engaging point between the slider 5 and the guide rail 6 is covered by the base portion 6a of the guide rail 6 so that the passenger is not injured thereat. In addition, it is easy to fit the trim cover 11 to the guide rail 6 because it can be directly fixed on the base portion 6a of the guide rail 6. Also, no provision of the bracket is required so that the passenger compartment can be effectively used and comfortable. The omission of the bracket for the trim cover results in the decreasing of the weight of the vehicle body and the low cost in manufacture. In addition, it is unnecessary to reinforce the trim cover 11 because it is directly fixed to the guide rail 6, which can provide the same or similar advantageous results.

FIG. 7 shows a second embodiment of the present invention in which a roller 13 is attached to the slider 5 at its engaging portion 5' so as to decrease the moving resistance. Except this point, the second embodiment of the present invention has substantially the same construction and functions substantially in the same manner as in the first embodiment in FIGS. 5 and 6.

Figure 8:
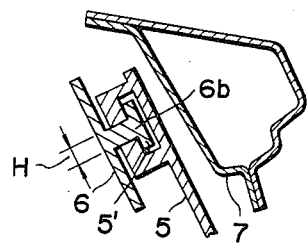

FIG. 8 shows a third embodiment of the present invention. The engaging portion 6b of the guide rail 6 is of I-shape in section. The engaging portion 5' of the slider 5 has a recess of the corresponding shape in section thereto so that the engaging portion 6b of the guide rail 6 can fit in the engaging portion 5' of the slider 5 so as to increase its holding force. Also, it is easy to control the thickness or height H thereof so that the guide rail 6 can be easily curved corresponding to the shape of the roof side rail 7. Thus, the applicability of the guide rail 6 onto the vehicle body is improved.

Figure 9:
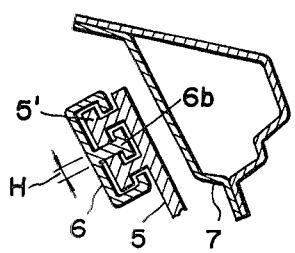

FIG. 9 shows a fourth embodiment of the present invention wherein the guide rail 6 is of a E-shape section. The slider 5 has two engaging portions 5' of the T-shape in section corresponding to the engaging portion of the guide rail 6 so that its holding force is remarkably increased. Also, because the control of the height or thickness H of the guide rail 6 is easy, the guide rail 6 can be securely fitted to the roof side rail 7 even if the roof side rail 7 is curved.

Figure 10:
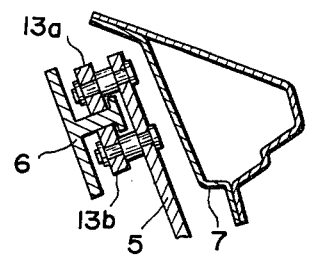

FIG. 10 shows a fifth embodiment of the present invention which is a modification of the third embodiment as shown in FIG. 8. The slider 5 is provided with a pair of rollers 13a and 13b so that the slider 5 can smoothly slide along the guide rail as compared with the third embodiment shown in FIG. 8.

Figure 11:
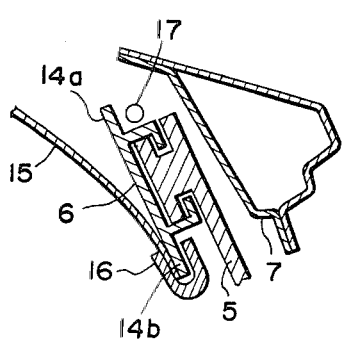

FIG. 11 shows a sixth embodiment of the present invention. The guide rail 6 extends upwardly and downwardly at its upper and lower edges to form the upper flange 14a and the lower flange 14b. The upper flange 14a covers a harness 17. The lower edge of the head lining cloth 15 is superposed on and fixedly held by the lower flange 14b of the guide rail 6 by the trim cover 16. The provision of the lower flange 14b can provide an easy attachment of the trim cover 16.

Figure 12:
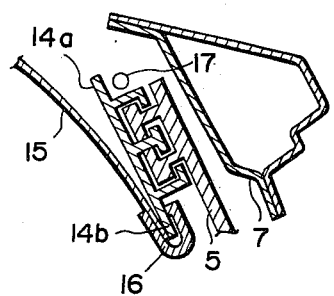
FIG. 12 is a sectional view showing a modification of the sixth embodiment shown in FIG. 11.

FIG. 12 shows a seventh embodiment of the present invention which is a modification of the fourth embodiment shown in FIG. 9. The guide rail 6 extends upwardly and downwardly at its upper and lower edges so as to form the upper flange 14a and the lower flange 14b. The upper flange 14a covers a harness 17 in a similar way to the sixth embodiment shown in FIG. 11. Also, the lower flange 14b fixedly supports the lower edge of the head lining cloth 15 by means of the trim cover 16. In such a construction, the trim cover 16 can be easily attached.

Figure 13:
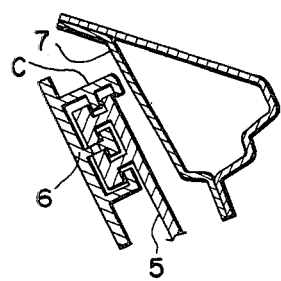
FIG. 13 is a sectional view showing an eight embodiment of the present invention.

FIG. 13 shows an eight embodiment of the present invention which is a modification of the fourth embodiment shown in FIG. 9. The guide rail 6 extends at its upper edge so as to form a cover C for the upper portion of the slider 5 thereby to improve its appearance. Also, it increases an area for holding the slider 5 so that the slider 5 can smoothly slide. In addition, the extending portion of the guide rail 6 can separate the slider 5 from the harness and others so as to improve the safety for the driver or passengers. This construction can be equally applied to the other embodiments.

Figure 14:
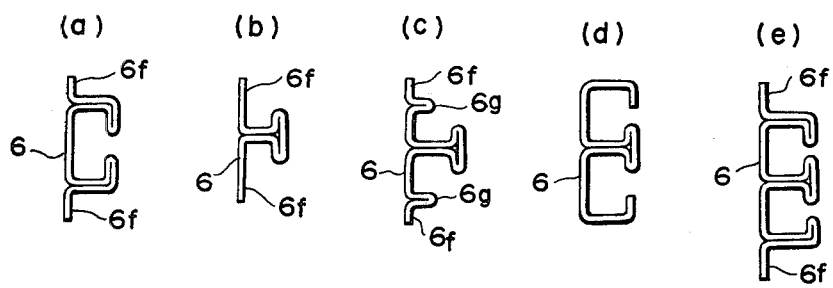
FIGS. 14(a) to 14(e) show five different forms of a guide rail for use in a seat belt apparatus according to the present invention.

FIGS. 14(a) through 14(e) show five different forms of the guide rail 6. All of the guide rails 6 are produced in a rolling method. In FIG. 14(a), the guide rail 6 has a C-shape section and its upper and lower flanges 6f. In FIG. 14(b), the guide rail 6 has a T-shape section and its upper and lower flanges 6f. In FIG. 14(c), the guide rail 6 has a T-shape section and its flanges 6f and projections 6g at its upper and lower edges. In FIG. 14(d), the guide rail 6 has an E-shape section. In FIG. 14(e), the guide rail 6 has an E-shape section and its flanges 6f at its upper and lower edges.

The guide rails shown in FIGS. 14(a) through 14(e) can be easily curved along its longitudinal direction so as to correspond to the curved surface of the roof side rail 7.

Figure 15:
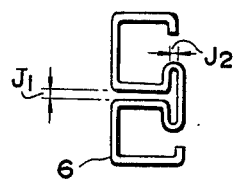
FIG. 15 is an end view showing a further form of a guide rail according to the present invention.

FIG. 15 shows in detail a E-shape guide rail 6 made by a rolling method. The sizes or dimensions $J_1$ and $J_2$ of the guide rail 6 can be easily changed so as to adjust the structural strength thereof and the space for receiving the engaging portion 5' of the slider 5. Also, as such a type of guide rail 6 has a spring effect, the slider 5 can be smoothly guided thereby.

Figure 16:
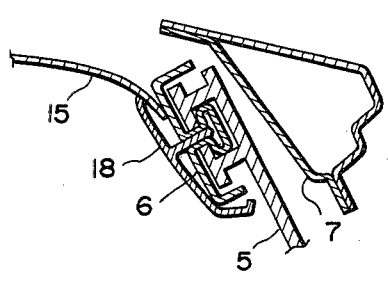
FIG. 16 shows still a further embodiment of the present invention.

As shown in FIG. 16, a trim cover 18 can be attached into a clearance formed in the guide rail 6 by its spring force for locking the lower end or edge of the head lining cloth 15 so that the attachment of the trim cover 18 can be remarkably facilitated.

Figure 17:
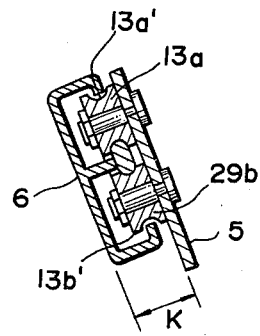
FIG. 17 shows another embodiment of the present invention.

FIG. 17 shows another embodiment of the present invention. The slider 5 has a pair of rollers 13a and 13b which moves in cooperation with the guide rail 6 of a E-shape in section. The grooves 13a' and 13b' respectively. The edges of the E-shape guide rail 6 engage the grooves 13a' and 13b' so that the holding force of the guide rail 6 can be increased. Thus, the dimension or size K in FIG. 17 can be set short or small so as to increase the upper space of the passenger compartment.

What is claimed is:

1. A seat belt system for an automotive vehicle, comprising:
   a shoulder belt, including a lower end which is fixed to the floor of the vehicle body and a slider connected to the upper end, said slider having an engaging portion;
   a guide rail fixed on one side wall of the vehicle body along its longitudinal direction, said guide rail having an open side and an opposite closed base portion and an engaging portion adapted to be engaged with the engaging portion of said slider, so that said slider is slidably fitted to said guide rail;
   a roof side rail fixed to the vehicle body and having an inner wall inclined inwardly with respect to the interior of the vehicle body and arranged in parallel to said guide rail;
   means for actuating said slider in response to the opening and closing of a door of the automotive vehicle to move the slider between a forward and a rear position;
   means for locking said slider in its rearmost position;
   said engaging portion of said guide rail facing the side wall of the vehicle body;
   said slider being slidably movable between said guide rail and said side wall of the vehicle body;
   said guide rail having its open side facing said side wall of the vehicle body and its opposite closed base portion facing the interior of the vehicle body;
   said engaging portion of said slider being inserted through said open side of said guide rail into said engaging portion of said guide rail; and
   said open side of said guide rail being set adajcent to said inwardly-inclined inner wall of said roof side rail to form a clearance for slidable movement of said slider in such a manner that the upper edge of said slider contacts the inner wall of said roof side rail when said shoulder belt undergoes a predetermined downward force.

2. The seat belt system of claim 1, wherein the guide rail is made by a rolling method.

3. The seat belt system of claim 1, wherein the slider has a roller engaging the engaging portion of the guide rail.

4. The seat belt system of claim 1, wherein the guide rail is of a channel shape.

5. The seat belt system of claim 1, wherein the guide rail is of a E-shape in section.

6. The seat belt system of claim 1, wherein the guide rail is of a T-shape in section.

7. The seat belt system of claim 1, wherein the guide rail is of a C-shape in section.

8. The seat belt system of claims 4, 5, 6, or 7, wherein the guide rail has its mounting flange extending from the upper and/or lower edge thereof.

9. The seat belt system of claim 1, wherein the guide rail has a portion extending to cover the upper portion of the slider.

10. The seat belt system of claims 2 or 3, further comprising a trim cover fixed to the guide rail.

* * * * *